(12) United States Patent
Kijima

(10) Patent No.: US 6,513,816 B1
(45) Date of Patent: Feb. 4, 2003

(54) CARRYING APPARATUS FOR GOLF BAG

(76) Inventor: Ryodo Kijima, 8-14-301 Y's Trad, Higashisuna 4-chome, Koto-ku, Tokyo (JP)

(*) Notice: Subject to any disclaimer, the term of this patent is extended or adjusted under 35 U.S.C. 154(b) by 0 days.

(21) Appl. No.: 09/977,738

(22) Filed: Oct. 15, 2001

(51) Int. Cl.$^7$ .................................................. B62B 1/00
(52) U.S. Cl. ............................ 280/47.26; 280/DIG. 6; 248/96
(58) Field of Search .................. 280/47.26, DIG. 6, 280/47.17, 47.18, 47.24, 47.34, 47.131, 37, 38, 39, 40, 651, 652, 639, 79.2; 248/96

(56) References Cited

U.S. PATENT DOCUMENTS

| | | | |
|---|---|---|---|
| 2,414,941 A | * 1/1947 | Freis | 280/42 |
| 2,902,238 A | * 9/1959 | Tolman | 248/96 |
| 4,635,951 A | * 1/1987 | Berfield et al. | 280/47.34 |
| 5,029,883 A | * 7/1991 | Derito | 280/35 |
| 5,351,983 A | * 10/1994 | Descalo | 280/646 |
| 5,573,211 A | * 11/1996 | Wu | 248/96 |
| 6,000,712 A | * 12/1999 | Wu | 280/639 |
| 6,019,324 A | * 2/2000 | Wu | 248/96 |
| 6,027,128 A | * 2/2000 | Stich et al. | 280/47.16 |
| 6,299,183 B1 | * 10/2001 | Kaneko | 280/47.26 |
| 6,364,327 B1 | * 4/2002 | Liao | 280/40 |
| 6,439,585 B1 | * 8/2002 | Tan | 280/47.26 |
| 6,460,867 B2 | * 10/2002 | Sciulli | 280/47.26 |

FOREIGN PATENT DOCUMENTS

JP  A-6970-2 C  1/1988

* cited by examiner

Primary Examiner—Brian L. Johnson
Assistant Examiner—Kelly E Campbell
(74) Attorney, Agent, or Firm—R. Neil Sudol; Coleman Sudol Sapone, P.C.

(57) ABSTRACT

A golf bag carrying apparatus that attaches to golf bags of various sizes easily and securely. The apparatus is structured such that a front main body has tire wheels in the front, a plate-like portion in the rear bottom and an engagement member movable in the rear bottom and an engagement member movable in the longitudinal direction and urged rearward by a spring. A main body has a plate like portion in the front bottom, an adjusting engagement member opposing to the engagement member and an adjusting screw member engaged with the adjusting engagement member. Both the main bodies are provided oppositely. Both the plate-like portions are engaged to slide in the longitudinal direction making both the main bodies constitute a truck to place a golf bag. The truck has a fastening belt. Opposing sides of both the main bodies have curved engagement wall surfaces. Both the engagement members have curved surfaces with smaller curvature.

16 Claims, 8 Drawing Sheets

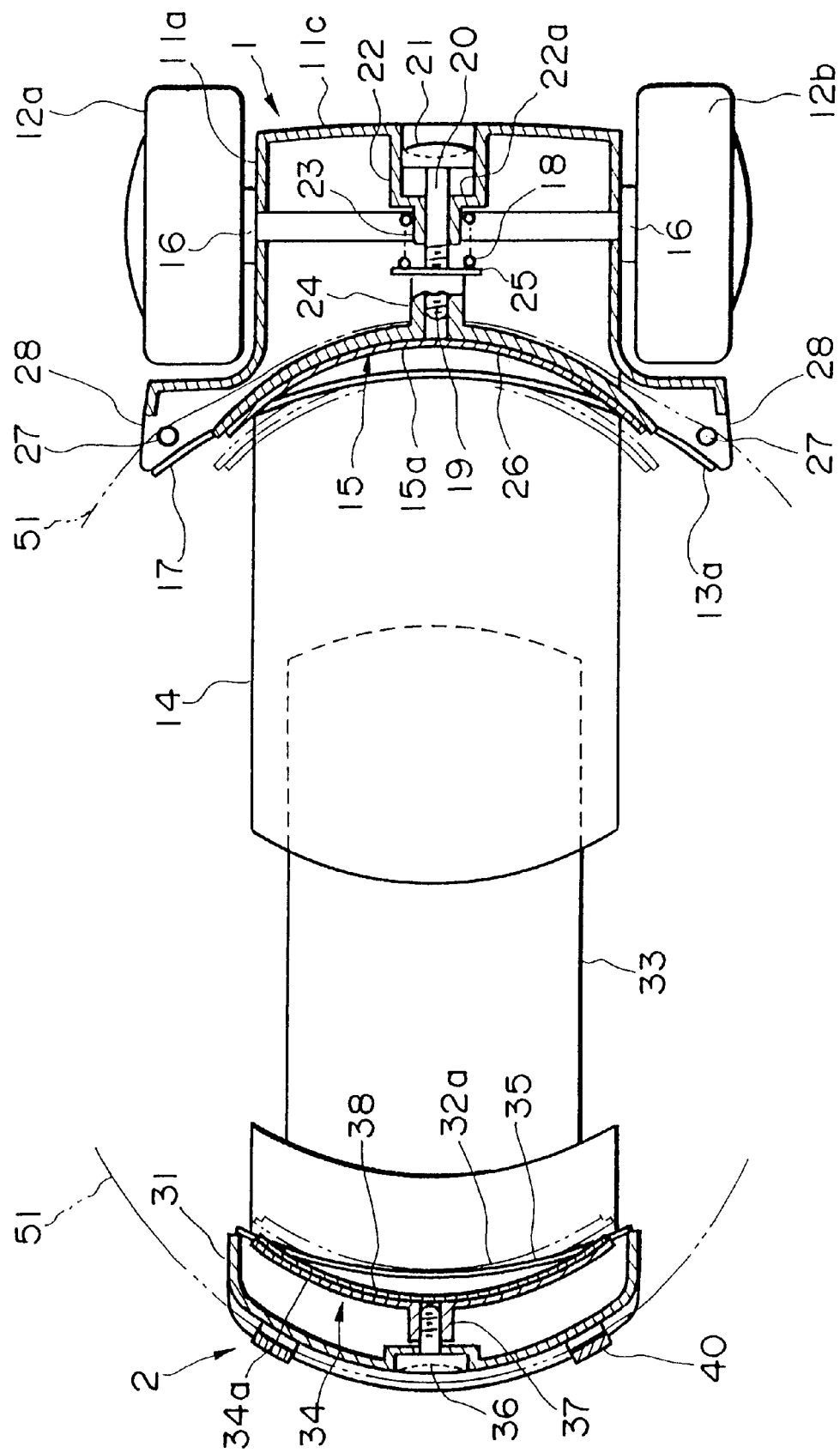

CARRYING APPARATUS FOR GOLF BAG

BACKGROUND OF THE INVENTION

1. Field of the Invention

The present invention relates to a carrying apparatus for moving a golf bag, and more particularly to a carrying apparatus for a golf bag, the apparatus being attached to the golf bag so as to make it easy to move the golf bag.

2. Description of the Conventional Art

In conventional, for example of this kind of carrying apparatus for a golf bag, there has been proposed a carrying apparatus described in Japanese Unexamined Utility Model Publication No. 63-8067 (hereinafter, refer to "a conventional apparatus"). The conventional apparatus is provided with a mounting table plate for mounting a golf bag thereon, tire wheels mounted to both sides of one end of the mounting table plate, a fixed engagement body stood fixedly on an end portion in the tire wheel side of the mounting table plate, a movable engagement body opposing to the fixed engagement body each other and provided so as to freely slide in a direction toward or apart from the fixed engagement body and freely fix to the table plate at a desired position, a belt provided with a buckle at one end and connecting at another end to one side of the fixed engagement body, and a belt having a predetermined length and provided so as to connect at one end thereof to another side of the fixed engagement body.

In the conventional apparatus, the movable engagement body is fixed to the mounting table plate at a position having a suitable interval with respect to the fixed engagement body, a bottom portion (a cylinder portion) of the golf bag is inserted between both of the engagement bodies so as to mount on the mounting table plate, and both the belts is fastened to attach. Further, the structure is made such that the golf bag is inclined to the tire wheel side in this state, and the golf bag is moved while the tire wheels being rotated. Accordingly, it is easy to move the golf bag, and it is possible to apply the apparatus to several kinds of golf bags having different sizes of the cylinder body in the bottom portion by adjusting the interval distance of the movable engagement body with respect to the fixed engagement body.

However, the conventional apparatus mentioned above has problems to be improved in view of the following points. That is, since the conventional apparatus is structured such that the movable engagement body is formed into an L-shaped metal fitting, a nut is assembled in a portion of a horizontal plate of the metal fitting, a long hole directed in a longitudinal direction is formed in the mounting table plate, the tip end of a screw inserted into the long hole is engaged with the nut so as to be fastened thereto, and the movable engagement body is fixed to the fixed engagement body, a fixing operation of the movable engagement body is troublesome.

Further, since the conventional apparatus is structured such that the inner wall surface of the fixed engagement body and the inner wall surface of the movable engagement body are formed into curved engagement wall surfaces having substantially the same radius of curvature so as to engage in such a manner as to hold the cylinder portion of the bottom portion of the golf bag between both of the engagement wall surfaces from both sides, it is possible to stably engage in the case that a curvature of an outer peripheral surface of the cylinder portion in the bottom portion of the golf bag is substantially the same level as the curvature of the wall surfaces, however, in the case that a difference between the curvature of the cylinder portion and the curvature of the engagement wall surfaces is large, for example, in the case of a cylinder portion having a small diameter, an engagement state becomes unstable even when both of the engagement bodies are brought into contact with the cylinder portion. As a result, fixing (mounting) of the cylinder portion becomes unstable, so that there is a risk that the carrying apparatus falls out from the cylinder portion.

SUMMARY OF THE INVENTION

The present invention is made by taking the matters mentioned above into consideration, and an object of the present invention is to provide a carrying apparatus for a golf bag, which is easily attached to the golf bag, fits to golf bags having various kinds of sizes, keeps a stability and can be securely attached.

In order to achieve the object mentioned above, in accordance with one aspect of the present invention, there is provided a carrying apparatus for a golf bag comprising:

a front main body of a truck mounting a golf bag thereon;

a rear main body of a truck provided so as to oppose to the front main body; and a fastening belt provided in connection with the front main body of the truck and the rear main body of the truck, wherein the front main body of the truck has a body, tire wheels rotatably provided in both side portions in a front end side of the body, curved engagement wall surfaces formed in an upper edge portion and a lower edge portion at the rear end of the body from one side of the body to another side thereof in a curve at a predetermined curvature, a plate-like portion for a load carrying platform horizontally protruding rearward from a rear end bottom portion of the body, and an engagement member provided in the body so as to be positioned between both the curved engagement wall surfaces in such a manner as to freely move in the longitudinal direction and be urged rearward by a spring, a surface of the engagement member is formed into a curved surface curved at a smaller curvature than that of the curved engagement wall surfaces, the rear main body of the truck has a body, curved engagement wall surfaces formed in an upper edge portion and a lower edge portion at the front end of the body from one side of the body to another side thereof in a curve at the same curvature as that of the former curved engagement wall surfaces, a plate-like portion for a load carrying platform horizontally protruding forward from a front end bottom portion of the body, and an adjusting engagement member provided in the body so as to be positioned between both the curved engagement wall surfaces in such a manner as to freely move in the longitudinal direction, engaged with an adjusting screw member rotatably provided in the body, and provided so as to move forward or backward by rotating the screw member clockwise or counterclockwise, a surface of the engagement member is formed into a curved surface at substantially the same curvature as that of the curved surface of the engagement member in the front main body of the truck, and both the load carrying platform plate-like portions are relatively engaged with and connected to each other so as to freely slide in the longitudinal direction, thereby moving the front main body of the truck and the rear main body of the truck to close to each other by fastening the fastening belt.

In accordance with this invention, the adjusting engagement member is brought into contact with the outer peripheral surface of the cylindrical bottom portion of the golf bag by rotating the adjusting screw member of the rear main body of the truck so as to forward move the adjusting engagement member, and on the contrary, the curved engagement wall surface of the body in the rear main body is brought into contact with the outer peripheral surface of the cylindrical bottom portion by rearward moving the engagement member. Further, due to a positional relationship of the adjusting engagement member with respect to the curved engagement wall surface, it is possible to bring both of the engagement wall surface and the engagement member into contact with the cylindrical bottom portion.

On the other hand, when pressing the engagement member of the front main body of the truck against the spring force, the engagement member moves to a forward side, and when releasing the pressing force, the engagement member is pressed back due to a spring force and is returned to an original position. Further, the front main body of the truck and the rear main body of the truck can be freely moved close to each other and apart from each other by sliding both the load carrying platform plate-like portions. Accordingly, it is possible to stably and securely attach the golf bag by rotating the adjusting screw member so as to adjust the position of the adjusting engagement member in correspondence to the size of the bottom portion of the golf bag, mounting the golf bag on the load carrying platform plate-like portion and fastening the belt.

In accordance with another aspect of the present invention, there is provided a carrying apparatus for a golf bag as recited in the invention mentioned above, further comprising handle apparatuses attached to an upper end portion of an opening of the golf bag, wherein the handle apparatuses are provided so as to face to each other at a predetermined interval, and have mounting device main bodies provided with a pair of fitting tube bodies of predetermined lengths having open upper ends and mounting hook metal fittings, handle portions provided with a pair of length adjusting rods having predetermined lengths and grips disposed so as to connect upper ends of both the rods and provided so as to fitly insert both the rods to both the tube bodies in such a manner as to freely slide in the axial direction, stoppers provided in upper ends of both the fitting tube bodies so as to freely lock and release both the rods with both the tube bodies to fix and unfix at optional positions, and fastening belts fixedly mounted to the lower end sides of the mounting device main bodies.

In accordance with this invention, in addition to the operational effect due to the invention mentioned above, it is possible to smoothly and well perform a traction operation at a time of moving the golf bag.

In the present invention, each of the curved engagement wall surfaces in the front main body of the truck and the rear main body of the truck and both the curved surfaces in the engagement member and the adjusting engagement member can employ a structure lined with an elastic plate material. In the present invention, a pressure of the spring of the engagement member in the front main body of the truck can be structured such as to be adjustable. Further, in the present invention, a leg corresponding to the tire wheels can be provided in the lower end of the rear main body of the truck.

BRIEF DESCRIPTION OF THE DRAWINGS

FIG. 3 is a horizontal cross sectional view of the apparatus, shown for the purpose of describing an operation;

DESCRIPTION OF THE PREFERRED EMBODIMENT

Figure 1:
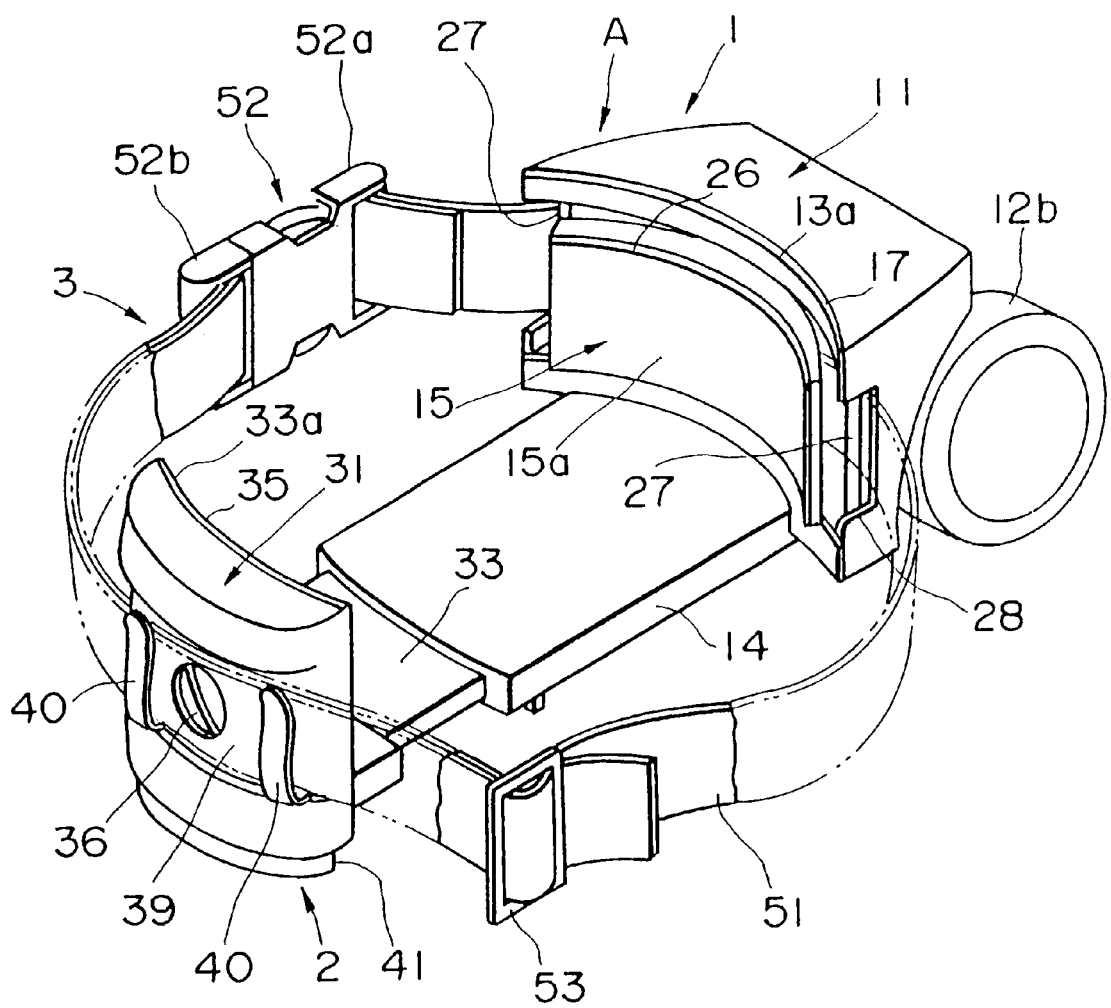
FIG. 1 is a perspective view showing one embodiment of a carrying apparatus for a golf bag in accordance with the present invention.
Figure 2A:
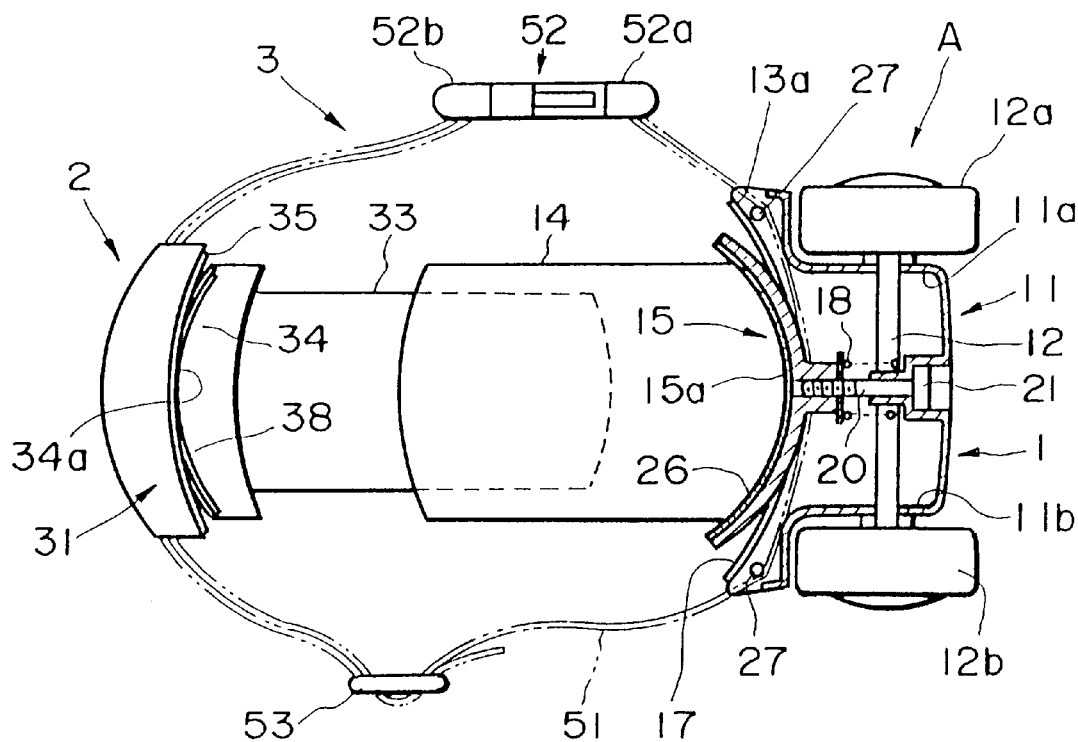
FIG. 2A is a horizontal cross sectional view of the apparatus.
Figure 2B:
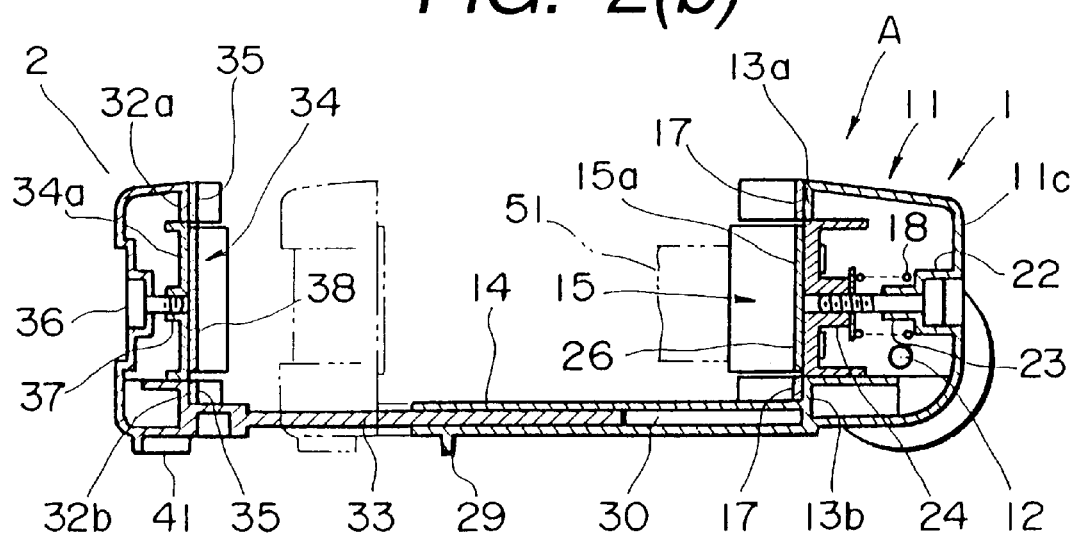
FIG. 2B is a vertical cross sectional view of the apparatus.
Figure 4A:
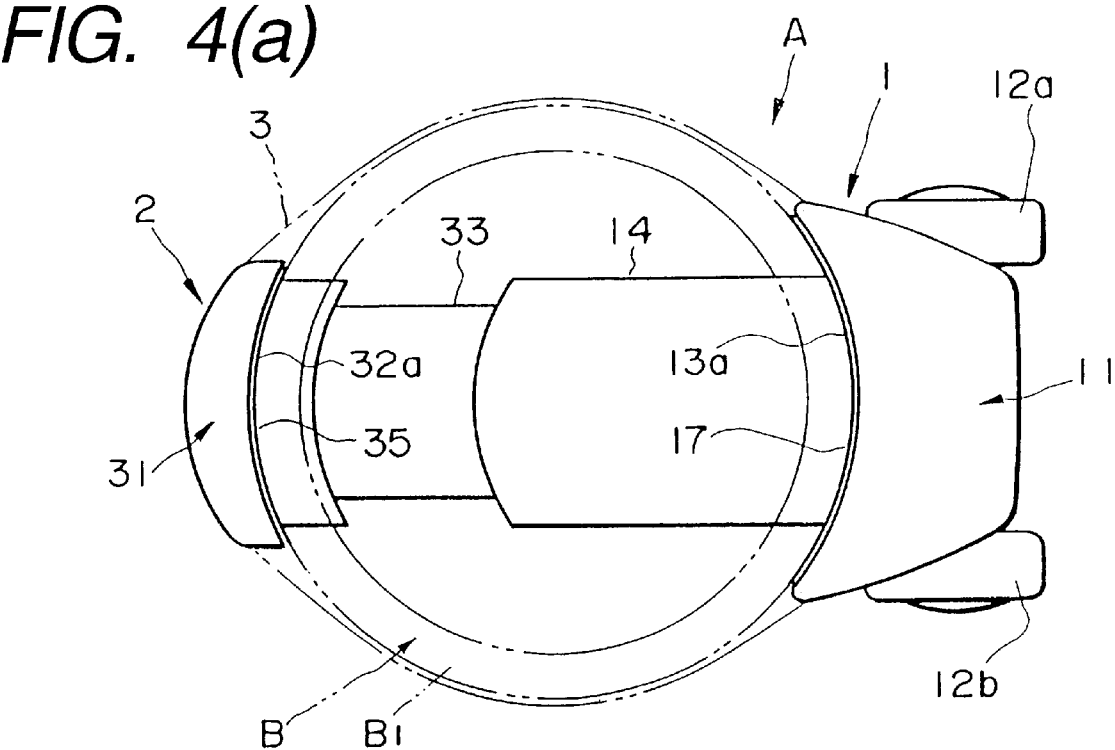
FIGS. 4A and 4B are schematic view showing a use state of the apparatus.
Figure 4B:
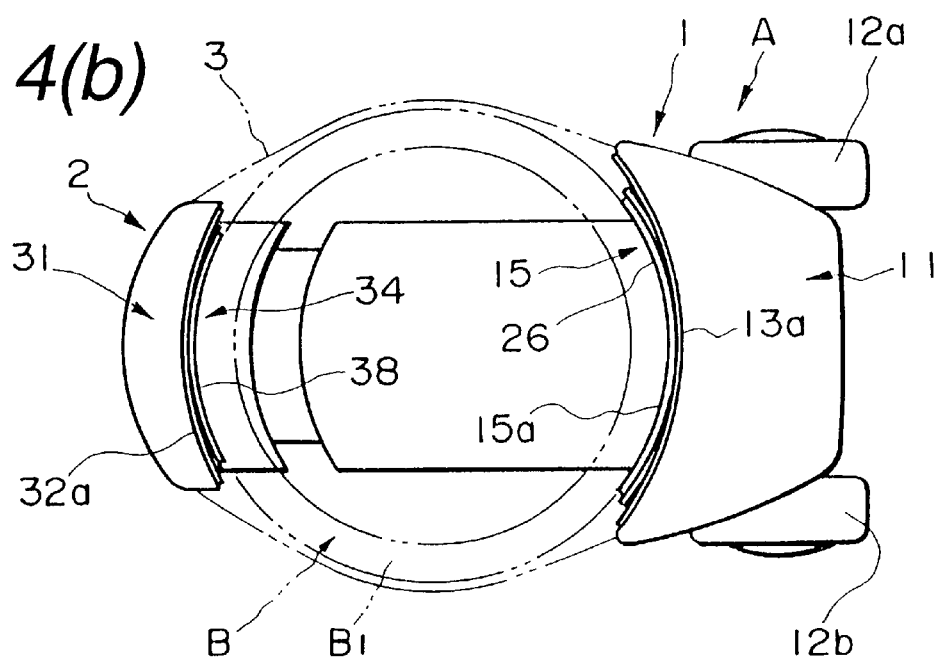

A description will be given of one example of an embodiment in accordance with the present invention with reference to the accompanying drawings. FIG. 1 is a perspective view showing one embodiment of a carrying apparatus for a golf bag, FIG. 2A is a horizontal cross sectional view of the apparatus, FIG. 2B is a vertical cross sectional view of the apparatus, FIG. 3 is a horizontal cross sectional view of the apparatus, shown for the purpose of describing an operation, and FIGS. 4A and 4B are schematic views showing a use state of the apparatus;

In FIGS. 1 to 4, the carrying apparatus for the golf bag in accordance with this embodiment has a front main body 1 of a truck A mounting a golf bag B thereon, a rear main body 2 provided so as to face to the front main body 1, and a fastening belt 3 provided in connection with the front main body 1 and the rear main body 2 in the truck A.

The front main body 1 of the truck A has a body 11, tire wheels 12a and 12b provided in both side portions in the front end side of the body 11, curved engagement wall surfaces 13a and 13b formed in an upper edge portion and a lower edge portion at a rear end of the body 11, a load carrying platform plate-like portion 14 provided in a rear end bottom portion of the body 11, and an engagement member 15 provided so as to be positioned between both the curved engagement wall surfaces 13a and 13b.

The tire wheels 12a and 12b are provided for the purpose of traveling and moving the truck A in an inclined state, and in this embodiment, the structure is made such that a fixed shaft 12 is provided so as to bridge between left and right side plates 11a and 11b of the body 11, and both of the tire wheels 12a and 12b are rotatably provided to both protruding ends of the shaft 12. In this case, it is possible to employ a structure in which the shaft 12 is rotatably supported to the side plates 11a and 11b and both the tire wheels 12a and 12b are fixedly provided to the rotary shaft. Reference numerals 16 and 16 denote collars provided between both the tire wheels 12a, 12b and both the side plates 11a, 11b and attached to the shaft 12.

Both the curved engagement wall surfaces 13a and 13b are formed so as to be curved in a recess shape to the forward side of the main body 11 at a predetermined curvature from one side of the body 11 to another side, that is, from one side plate 11a to another side plate 11b, and are formed in an upper edge portion and a lower edge portion at the rear portion of the main body 11. Further, in this embodiment, elastic plate members 17 and 17 such as rubber members are additionally adhered to both the engagement wall surfaces 13a and 13b in with an adhesion or the like so as to be lined.

The load carrying platform plate-like portion 14 is structured such as to mount the golf bag B thereon, has a suitable thickness, width and length, and is horizontally protruded rearward from the rear end bottom portion of the body. A leg 29 having a height corresponding to the tire wheels 12a and 12b is provided at a lower end in a rear end side of the load carrying platform plate-like portion 14.

The engagement member 15 is positioned between both the engagement wall surfaces 13a and 13b and is provided in the body 11 so as to freely move in the longitudinal direction and be urged rearward by a spring 18. In this embodiment, a fitting tube portion 22 fitting a head portion 21 of a screw rod 20 having a screw groove 19 at a front end portion in such a manner as to freely rotate and freely slide in the axial direction is integrally formed in a front plate 11c of the body 11, and a supporting pipe body 23 for fitly and inserting and supporting the screw rod 20 to a front end of the tube portion 22 so as to freely slide in an axial direction is integrally provided extendedly. Further, a screw tube 24 engaging with the screw rod 20 is protruded from a middle portion of a back surface in the engagement member 15. Furthermore, the structure is made such that the screw rod 20 is slidably inserted through the tube body 23, the screw tube 24 of the engagement member 15 is engaged with the front end of the screw rod 20 so as to mount the engagement member 15 to the screw rod 20, and the spring 18 is interposed between the screw tube 24 and the fitting tube portion 22, thereby urging the engagement member 15 rearward. Reference numeral 25 denotes a spring receiving plate.

In accordance with the above description, the structure is made such that the engagement member 15 is freely movable in the longitudinal direction and pressed rearward by the spring 18, thereby moving backward to a position where the head portion 21 of the screw rod 20 is brought into contact with a rear plate 22a of the fitting tube portion 22. In this case, the surface of the engagement member 15 is set such as to protrude rearward from the surfaces of the curved engagement wall surfaces 13a and 13b at a time of moving backward. Further, the pressure of the spring 18 can be adjusted by rotating the screw rod 20.

The surface of the engagement member 15 is formed into a curved surface 15a which is curved in a recess shape to the forward side of the main body 11 with a smaller curvature than the curvature of the curved engagement wall surfaces 13a and 13b. Further, in this embodiment, an elastic plate member 26 such as a rubber member or the like is additionally adhered to the surface of the engagement member 15 with an adhesion or the like so as to be lined.

Further, guide rods 27 and 27 for guiding a belt are stood from both sides of the rear end portion in the body 11, and notch portions 28 and 28 are formed in center portions at rear ends of both of the side plates 11a and 11b in the body 11.

The rear main body 2 of the truck A has a body 31, curved engagement wall surfaces 32a and 32b formed in an upper edge portion and a lower edge portion at the front end of the body 31, a load carrying platform plate-like portion 33 provided in a front end bottom portion of the body 31, and an adjusting engagement member 34 provided so as to be positioned between both of curved engagement wall surfaces 32a and 32b.

Both the curved engagement wall surfaces 32a and 32b are formed so as to be curved in a recess shape to the rear side of the main body 31 with substantially the same curvature as that of the curved engagement wall surfaces 13a and 13b from one side of the body 31 to another side, and are provided in the upper edge portion and the lower edge portion of the main body 31 so as to oppose to both the engagement wall surfaces 13a and 13b. Further, in this embodiment, elastic plate members 35 and 35 such as a rubber member or the like are additionally adhered to the surfaces of both the engagement wall surfaces 32a and 32b with an adhesion or the like so as to be lined.

The load carrying platform plate-like portion 33 is structured such as to mount a golf bag B in combination with the plate-like portion 14, has suitable thickness, width and length, and is horizontally protruded forward from the front end bottom portion of the body 31. The load carrying platform plate-like portion 33 is engaged with and connected to the load carrying platform plate-like portion 14 of the main body 1 in the truck so as to freely slide in the longitudinal direction relatively. In this embodiment, an engagement hole 30 which the plate-like portion 33 is slidably engaged with and inserted into is longitudinally provided in the load carrying platform plate-like portion 14 in such a manner as to correspond to the thickness, the width and the length of the load carrying platform plate-like portion 33, and the plate-like portion 33 is engaged with and inserted into the engagement hole 30 from the front end side, whereby both the elements 14 and 33 are connected to each other. Accordingly, both the plate-like portions 14 and 33 are structured such as to freely slide in the longitudinal direction relatively.

The adjusting engagement member 34 is provided in the body 31 by engaging a screw tube 37 protruded from a middle portion of a back surface in the engagement member 34 with an adjusting screw member 36 provided in the body 31 so as to freely move in a longitudinal direction and freely rotate, and is structured such as to move forward or backward by rotating the screw member 36 clockwise or counterclockwise. Accordingly, the engagement member 34 protrudes out to the forward side from the surfaces of the curved engagement wall surfaces 32a and 32b at a time of moving forward, and is positioned in the rear side from the surfaces of the engagement wall surfaces 32a and 32b at a time of moving backward.

The surface of the engagement member 34 is formed into a curved surface 34a curved in a recess shape to the rear side of the main body 2 with substantially the same curvature as that of the curved surface 15a of the engagement member 15 in the front main body 1. Further, in this embodiment, an elastic plate member 38 such as a rubber member or the like is additionally adhered to the surface of the engagement member 34 with an adhesion or the like so as to be lined.

A belt engaging recess groove 39 is formed in the middle of the back surface in the body 31 from one side of the body 31 to another side, and belt pressing metal fittings 40 and 40 are provided at suitable portions on the back surface of the body 31. Further, a leg 41 having a height corresponding to the tire wheels 12a and 12b is provided at a lower end of the body. The leg 41 is structured such as to maintain the truck A in a horizontal state with keeping a balance with the tire wheels 12a and 12b. In this case, in this embodiment, the structure is made such that the leg 29 is also provided in the load carrying platform plate-like portion 14 of the front main body 1 so as to maintain a balance of the truck A, however, the leg 29in the side of the plate-like portion 14 may be omitted.

The fastening belt 3 is structured such as to fasten the truck A to the golf bag B so as to fix together. The fastening belt 3 in accordance with this embodiment has a belt 51 having a suitable length, a connection metal fitting 52 connecting the belt 51 in such a manner as to freely engage and disengage, and a buckle 53. The metal fitting 52 is constituted of two connection members 52a and 52b, and is structured such as to freely lock and release both of the members 52a and 52b to connect and disconnect.

One connection member 52a in the connection metal fitting 52 is mounted to one end of the belt 51. Further, the buckle 53 is slidably mounted to the belt 51, and the structure is made such that another connection metal fitting 52b is slidably engaged with and attached to the belt 51, another end side of the belt 51 is inserted through the buckle 53 and the buckle 53 optionally adjusts a length of the belt so as to fasten.

Further, the fastening belt 3 is provided with a hole (not shown) corresponding to the screw tube 24 at a suitable position of the belt 51, the belt 51 is extended between both the guide rods 27 and 27 of the front main body 1 by inserting the screw tube 24 into the hole, and in the side of the rear main body 2, the belt 41 is engaged within the recess groove 39 of the body 31 and slidably held by the pressing metal fittings 40 and 40 so as to be attached to the truck A. Accordingly, the structure is made such that the front main body 1 and the rear main body 2 in the truck A are moved close to each other by engaging both the members 52a and 52b to connect and fastening the belt 51 with the buckle 53. In this case, the fastening belt 3 can be changed to the other optional structures, and in brief, the structure may be made such that the front main body 1 and the rear main body 2 are moved close to each other by fastening the belt.

Next, a description will be given of a method of use, an operation and the like. For example, in the case of a golf bag having a large size, the adjusting engagement member 34 is moved backward by rotating the screw member 36, the golf bag B is mounted on both the load carrying platform plate-like portions 14 and 33, and both the connection members 52a and 52b are connected. Then, when fastening the belt 51 in the portion of the buckle 53, both the main bodies 1 and 2 are moved close to each other, and hold a cylindrical bottom portion B1 of the golf bag B between the curved engagement wall surfaces 32a and 32b in the rear main body 2, and the curved engagement wall surfaces 13a and 13b in the front main body 1 via the elastic plate members 35 and 17 (refer FIG. 4A). Accordingly, the truck A is stably and securely attached to the golf bag B. Further, for example, in the case of a golf bag B having a small size, the adjusting engagement member 34 is moved forward by rotating the screw member 36, the golf bag B is mounted on the plate-like portions 14 and 33 in the same manner as mentioned above, and both the connection members 52a and 52b are connected. Then, when fastening the belt 51, both the main bodies 1 and 2 are moved close to each other, and hold the cylindrical bottom portion B1 of the golf bag B between the curved surface 34a in the adjusting engagement member 34, and the curved surface 15a in the engagement member 15 via the elastic plate members 38 and 26 (refer FIG. 4B). Accordingly, the truck A is stably and securely attached to the golf bag B. As mentioned above, it is possible to stably and securely attach the truck A to the golf bag B by adjusting the position of the adjusting engagement member 34 in correspondence to the size of the golf bag and mounting the golf bag B on the load carrying platform plate-like portion so as to fasten the belt 51. Further, the golf bag is moved, while the golf bag being inclined to the side of the tire wheels 12a and 12b in a state of attaching the truck to the golf bag in the manner mentioned above and the tire wheels being rotated.

Figure 5:
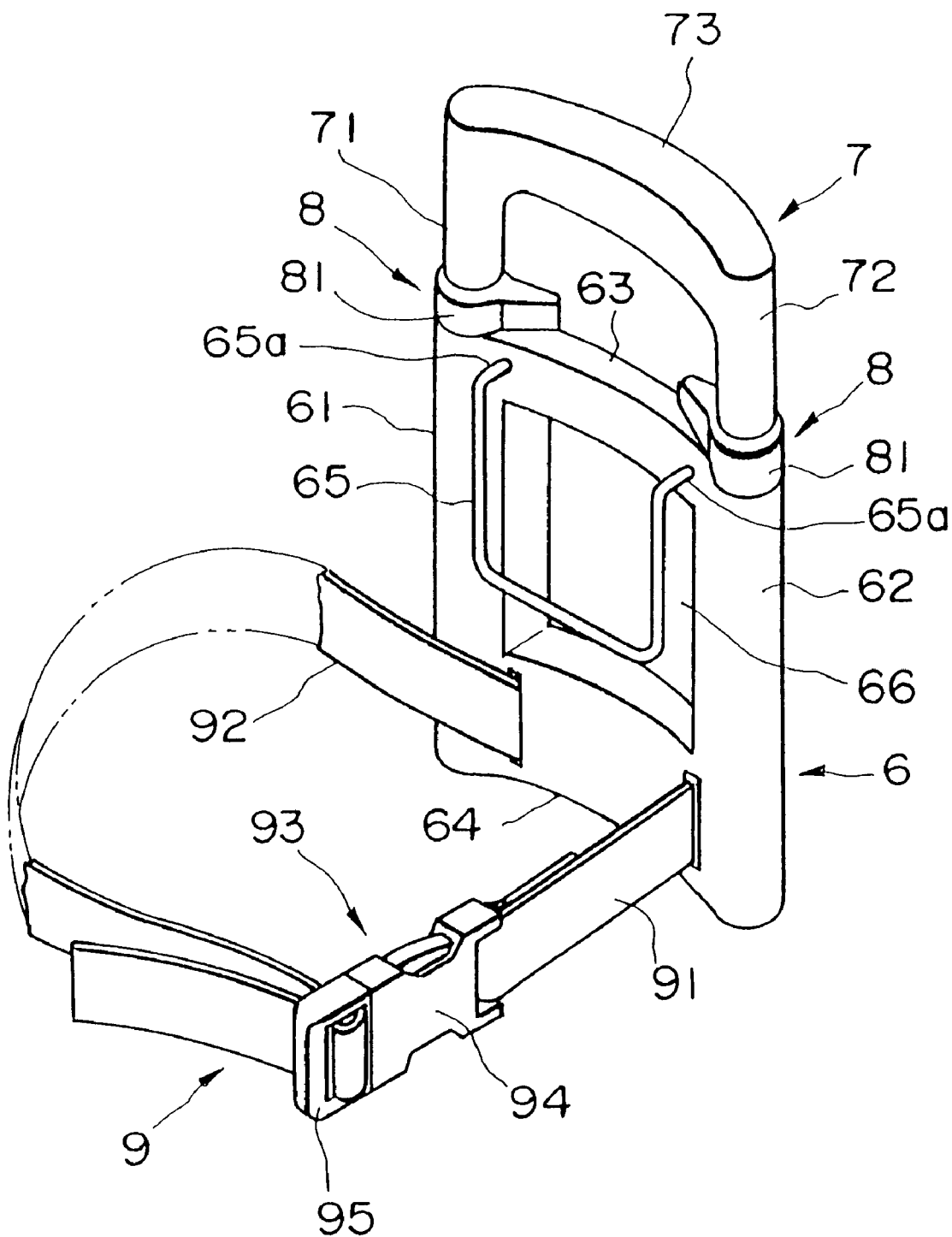
FIG. 5 is a perspective view showing one embodiment of a handle apparatus in a carrying apparatus for a golf bag in accordance with the present invention.
Figure 6:
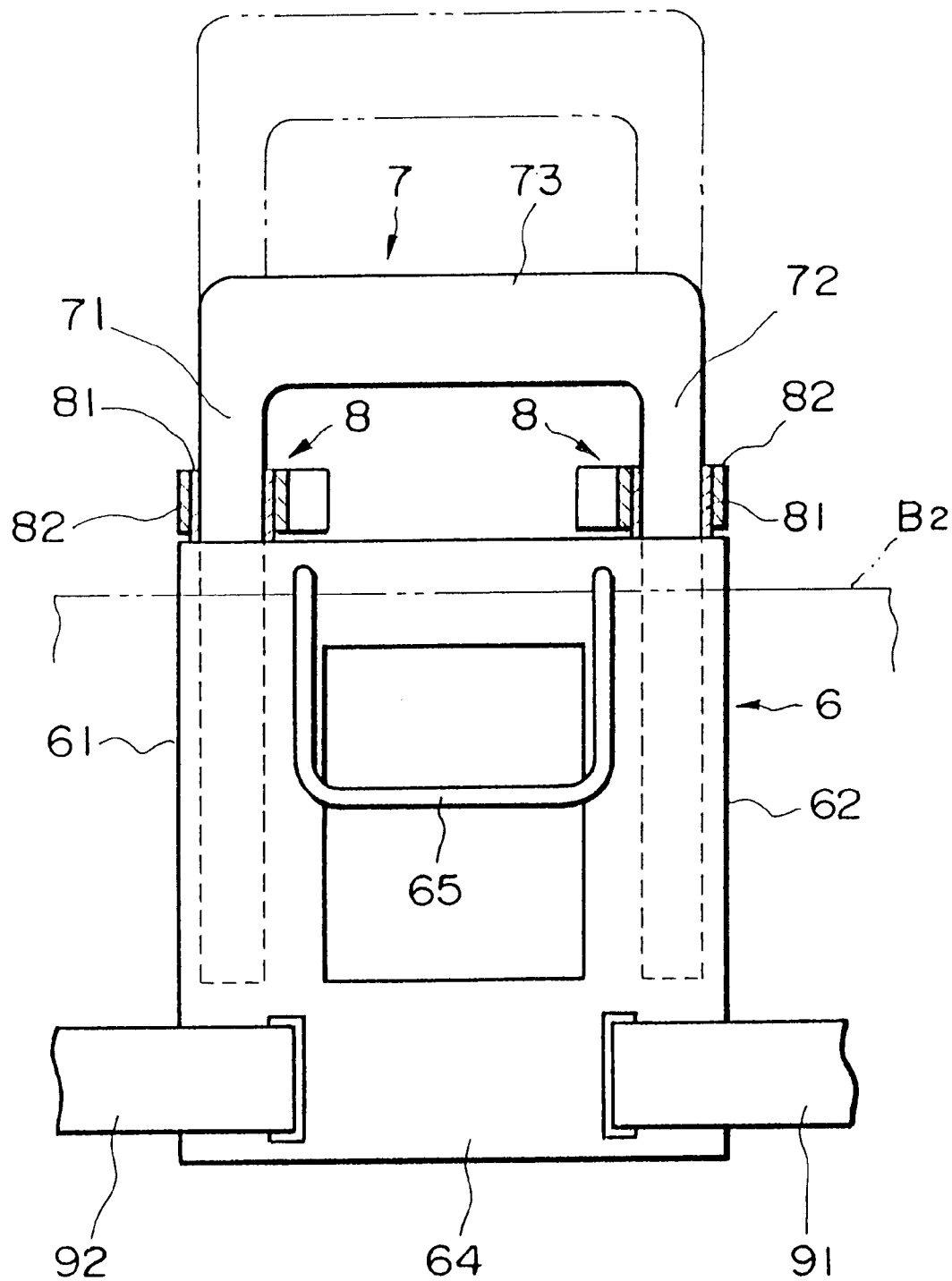
FIG. 6 is a front elevational view of the handle apparatus.
Figure 7:
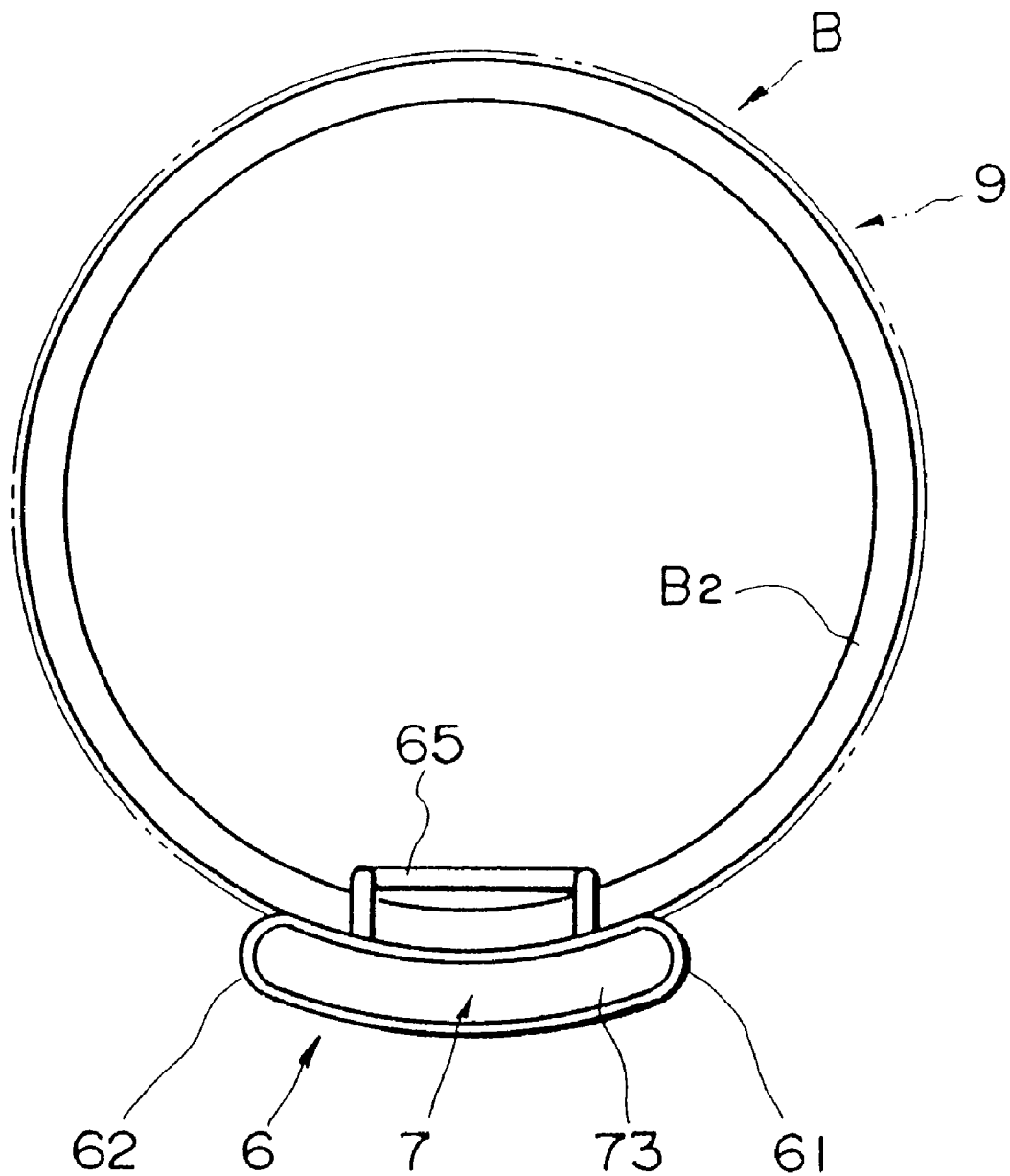
FIG. 7 is a schematic view showing a use state of the handle apparatus.

FIG. 5 is a perspective view showing one embodiment of a handle apparatus in a carrying apparatus for a golf bag in accordance with the present invention, FIG. 6 is a front elevational view of the handle apparatus, and FIG. 7 is a schematic view showing a use state of the handle apparatus. The handle apparatus is used for traction at a time of moving the golf bag.

In FIGS. 5 and 7, the handle apparatus in accordance with this embodiment has a mounting device main body 6 attached to an opening upper end portion B2 of the golf bag B, a handle portion 7, stoppers 8 and a fastening belt 9.

The mounting device main body 6 has a pair of fitting tube bodies 61 and 62 of a predetermined length having open upper ends provided so as to oppose to each other with a predetermined interval, connection members 63 and 64 connecting upper end portions and lower end portions in both the tube bodies 61 and 62, and a hook metal fitting 65 provided so that the upper end thereof is fixed to the connection member 63 in the upper portion side. The connection members 63 and 64 are curved at a suitable curvature in such a manner as to bring the mounting device main body 6 into contact with an outer peripheral surface of the upper end portion B2 in the golf bag B in a fitting manner. The hook metal fitting 65 hooks and suspends the mounting device main body 6 to the opening upper end portion B2 in the golf bag B, is formed in a C shape by a metal rod or the like so as to fix upper ends 65a and 65b to the connection member 63, and forms an interval 66 corresponding to a thickness of the opening upper end portion B2 between both the fitting tube bodies 61 and 62.

The handle portion 7 has a pair of length adjusting rod bodies 71 and 72 of a predetermined length fitly and inserted to the fitting tube bodies 61 and 62, and a grip 73 provided so as to connect upper ends of both the rod bodies 71 and 72, and both the rod bodies 71 and 72 are connected by the grip 73 with keeping an interval corresponding to that between both the tube bodies 61 and 62. Further, the handle portion 7 is provided so as to fitly insert both the rod bodies 71 and 72 to both the tube bodies 61 and 62 in such a manner as to freely slide in the axial direction.

The stoppers 8 are structured such as to freely lock and release both the rod bodies 71 and 72 to both the tube bodies 61 and 62 at optional positions to fix and unfix, and are respectively provided at upper ends of both the rod bodies 71 and 72. The stoppers 8 in accordance with this embodiment have split pattern rings 81 provided so as to be engaged with and attached to the upper ends of the bodies 61 and 62, and fastening ring members 82 provided so as to be rotatably fitted to the rings 81, fasten the split pattern rings 81 to the rod bodies 71 and 72 by rotating the ring members 82 in a predetermined direction so as to lock and fix the rod bodies 71 and 72 to the tube bodies 61 and 62, and loosen the fastening by the rings 81 by rotating the ring members 82 in the opposite direction to that mentioned above so as to release the lock mentioned above.

The fastening belt 9 is structured such as to fasten and fix the mounting device main body 6 to the opening upper end portion B2 of the golf bag B. The fastening belt 9 in accordance with this embodiment has two belts 91 and 92 having suitable lengths, and a buckle metal fitting 93 connecting and fastening both the belts 91 and 92. The buckle metal fitting 93 is constituted of two connection members 94 and 95, and is structured such as to freely lock and release both the members 94 and 95 to connect and disconnect, and one connection member 95 is constituted of a fastening metal fitting.

The belts 91 and 92 are provided so that one ends are fixed to the lower end side of the mounting device main body 6 in the hook metal fitting 65 side thereof, and one connecting member 94 of the buckle metal fitting 93 is mounted to another end of one belt 91. Further, the structure is made such that another end side of another belt 92 is inserted to another connecting member 95 so as to fasten by adjusting a length of the belt 92 with the connection member 95 (the fastening metal fitting). In this case, the fastening belt 9 can be changed to the other structures, and in brief, the structure may be made such that the mounting device main body 6 is fixed to the opening upper end portion of the golf bag B by fastening the belt.

Figure 8:
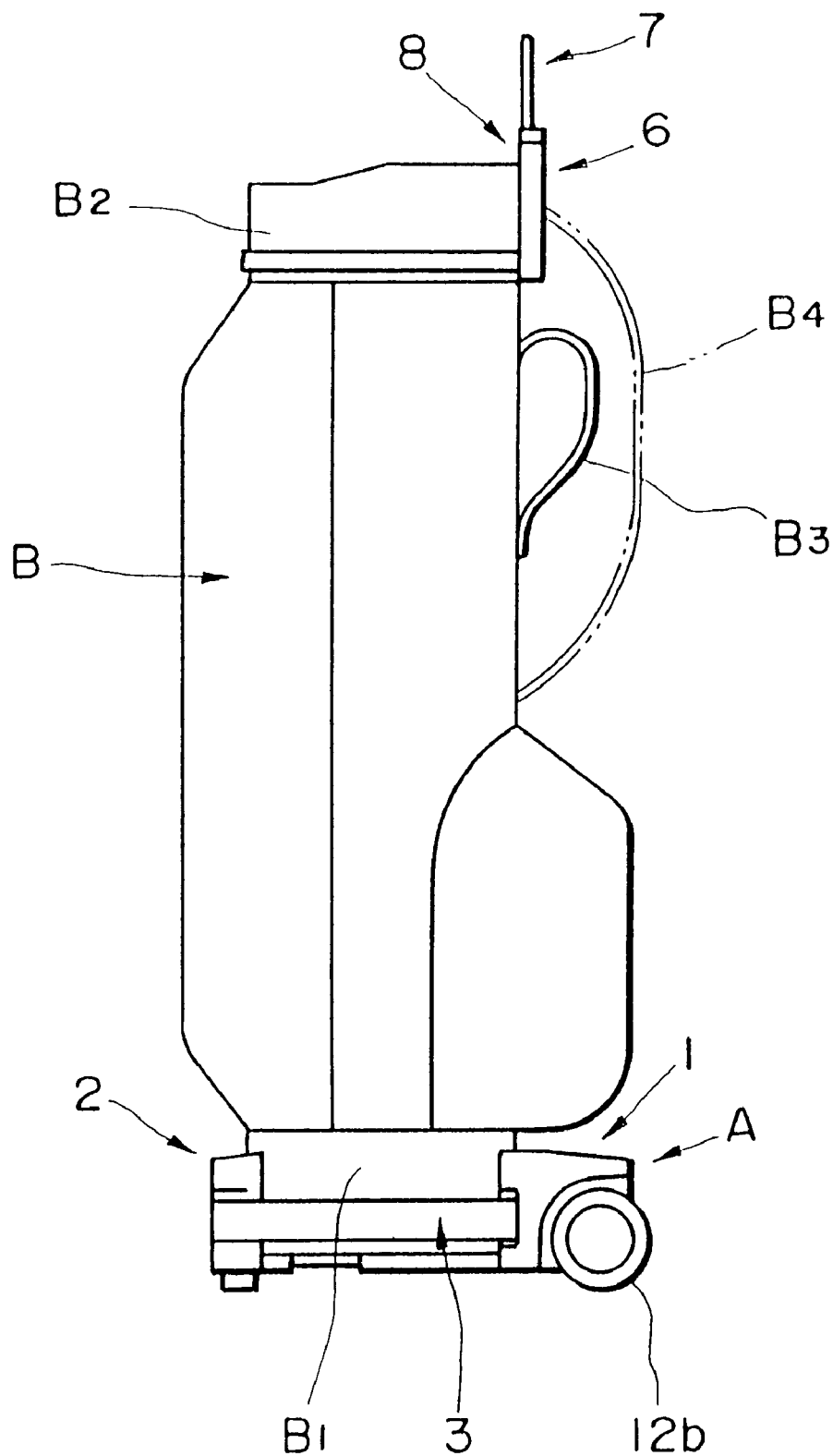
FIG. 8 is a schematic view showing a state of attaching the carrying apparatus and the handle apparatus to the golf bag.

The handle apparatus in accordance with this embodiment is structured in the manner mentioned above, as shown in FIG. 8, the hook metal fitting 65 is hooked to the opening upper end portion B2 of the golf bag B so as to suspend the mounting device main body 6 to the opening upper end portion B2, the mounting device main body 6 is fixed and fastened by fastening the belt 9, and as mentioned above, the truck A is attached to the cylindrical bottom portion B1 of the golf bag B. Further, the length of the handle portion 7 is optionally adjusted, the grip 73 is gripped by a hand, and the golf bag B is inclined to the side of the tire wheels 12a and 12b, towed and traveled. In this case, in FIG. 8, reference symbol B3 denotes a carrying belt for the golf bag, reference symbol B4 denotes a belt for a shoulder.

In accordance with the present invention, an attaching operation to the golf bag is easily performed, it is possible to attach to golf bags having various sizes, and it is possible to keeping attach with securing a stability. Further, in accordance with the invention described in the second aspect, in addition to the effect mentioned above, it is possible to smoothly and well perform a traction operation at a time of moving the golf bag.

What is claimed is:

1. A carrying apparatus for a golf bag comprising:

a front main body of a truck mounting a golf bag thereon;

a rear main body of the truck provided so as to oppose to the front main body; and a fastening belt provided in connection with said front main body of the truck and rear main body of the truck, wherein the front main body of the truck has a body, tire wheels rotatably provided in both side portions in a front end side of the body, curved engagement wall surfaces formed in an upper edge portion and a lower edge portion at the rear end of the body from one side of the body to another side thereof in a curve at a predetermined curvature, a plate portion for a load carrying platform horizontally protruding rearward from a rear end bottom portion of the body, and an engagement member provided in the body so as to be positioned between both the curved engagement wall surfaces in such a manner as to freely move in the longitudinal direction and be urged rearward by a spring, a surface of the engagement member is formed into a curved surface curved at a smaller curvature than that of the curved engagement wall surface, the rear main body of the truck has a body, curved engagement wall surfaces formed in an upper edge portion and a lower edge portion at the front end of the body from one side of the body to another side thereof in a curve at the same curvature as that of the former curved engagement wall surfaces, a plate portion for a load carrying platform horizontally protruding forward from a front end bottom portion of the body, and an adjusting engagement member provided in the body so as to be positioned between both the curved engagement wall surfaces in such a manner as to freely move in the longitudinal direction, engaged with an adjusting screw member rotatably provided in the body, and provided so as to move forward or backward by rotating the screw member clockwise or counterclockwise, a surface of the engagement member is formed into a curved surface at substantially the same curvature as that of the curved surface of the engagement member in the front main body of the truck, and both the load carrying platform plate portions are telescopically engaged with and connected to each other so as to freely slide in the longitudinal direction, thereby moving the front main body of the truck and the rear main body of the truck close to each other by fastening the fastening belt.

2. A carrying apparatus for a golf bag as claimed in claim 1, further comprising handle apparatuses attached to an upper end portion of an opening of the golf bag, wherein the handle apparatuses are provided so as to face to each other at a predetermined interval, and have mounting device main bodies provided with a pair of fitting tube bodies of predetermined lengths having open upper ends and mounting hook metal fittings, handle portions provided with a pair of length adjusting rods having predetermined lengths and grips disposed so as to connect upper ends of both the rods and provided so as to fitly insert both said rods to both the tube bodies in such a manner as to freely slide in the axial direction, stoppers provided in upper ends of both the fitting tube bodies so as to freely lock and release both the rods with both the tube bodies to fix and unfix at optional positions, and fastening belts fixedly mounted to the lower end sides of the mounting device main bodies.

3. A carrying apparatus for a golf bag as claimed in claim 2, wherein the curved engagement wall surfaces in the front main body of the truck and the rear main body of the truck and the curved surfaces in the engagement member and the adjusting engagement member are lined with an elastic plate member.

4. A carrying apparatus for a golf bag as claimed in claim 3, wherein a pressure of the spring of the engagement member in the front main body of the truck is structured such as to be adjustable.

5. A carrying apparatus for a golf bag as claimed in claim 4, wherein a leg with a height corresponding to the tire wheels is provided in the lower end of the rear main body of the truck.

6. A carrying apparatus for a golf bag as claimed in claim 3, wherein a leg with a height corresponding to the tire wheels is provided in the lower end of the rear main body of the truck.

7. A carrying apparatus for a golf bag as claimed in claim 2, wherein a pressure of the spring of the engagement member in the front main body of the truck is structured such as to be adjustable.

8. A carrying apparatus for a golf bag as claimed in claim 7, wherein a leg with a height corresponding to the tire wheels is provided in the lower end of the rear main body of the truck.

9. A carrying apparatus for a golf bag as claimed in claim 2, wherein a leg with a height corresponding to the tire wheels is provided in the lower end of the rear main body of the truck.

10. A carrying apparatus for a golf bag as claimed in claim 1, wherein the curved engagement wall surfaces in the front main body of the truck and the rear main body of the truck and the curved surfaces in the engagement member and the adjusting engagement member are lined with an elastic plate member.

11. A carrying apparatus for a golf bag as claimed in claim 10, wherein a pressure of the spring of the engagement member in the front main body of the truck is structured such as to be adjustable.

12. A carrying apparatus for a golf bag as claimed in claim 11, wherein a leg with a height corresponding to the tire wheels is provided in the lower end of the rear main body of the truck.

13. A carrying apparatus for a golf bag as claimed in claim 10, wherein a leg with a height corresponding to the tire wheels is provided in the lower end of the rear main body of the truck.

14. A carrying apparatus for a golf bag as claimed in claim 1, wherein a pressure of the spring of the engagement member in the front main body of the truck is structured such as to be adjustable.

15. A carrying apparatus for a golf bag as claimed in claim 14, wherein a leg with a height corresponding to the tire wheels is provided in the lower end of the rear main body of the truck.

16. A carrying apparatus for a golf bag as claimed in claim 1, wherein a leg with a height corresponding to the tire wheels is provided in the lower end of the rear main body of the truck.

* * * * *